UNITED STATES PATENT OFFICE.

KARL KÖNIG, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

RED COLOR-LAKE.

No. 878,964.     Specification of Letters Patent.     Patented Feb. 11, 1908.

Application filed November 6, 1906. Serial No. 342,181. (Specimens.)

*To all whom it may concern:*

Be it known that I, KARL KÖNIG, Ph. D., chemist, a citizen of the Empire of Germany, residing at Höchst-on-the-Main, Germany, have invented certain new and useful Improvements in the Manufacture of Color-Lakes, of which the following is a specification.

I have found that from the dyestuff, obtained by combining diazotized ortho-aminobenzoic acid and beta-naphthol, color lakes may be produced which are distinguished by their excellent covering power, remarkable fastness to light and absolute fastness to water and alcohol and very pure shade. The barium lake especially exhibits strongly dichroistic properties. This lake, when thickly applied, is of a bright orange-red of beautiful metallic luster; thinly applied, it is of a very pure blue-red shade.

The manufacture of the lake occurs in the usual manner, by treating, for instance, the aqueous suspension of the alkali salt of the dyestuff with solutions of metallic salts or by proceeding according to the process described in English Patent No. 27252 of 1905.

Example: 100 kilos of a paste of 20 per cent. strength of the sodium salt of the dyestuff are well suspended in water, whereupon a solution of 20 kilos of barium chlorid is added. The whole is heated to boiling and this temperature is maintained for a short time. The lake is finished in the usual manner. A substratum may be added at will.

Having now described my invention, what I claim is:—

As products, the color lakes derived from the azo-dyestuff obtained by combining ortho-aminobenzoic acid with beta-naphthol, being of a brilliant red pure tint, remarkable covering power when applied with oil, insoluble in water and alcohol and fast to light and lime.

In testimony, that I claim the foregoing as my invention, I have signed my name in presence of two subscribing witnesses.

KARL KÖNIG.

Witnesses:
JEAN GRUND,
CARL GRUND.